United States Patent [19]

Siregar

[11] 3,832,471

[45] Aug. 27, 1974

[54] METHOD OF FEEDING CATS THAWED FROZEN FISH FLAVORED WITH 5'-NUCLEOTIDES

[75] Inventor: John A. Siregar, Allentown, Pa.

[73] Assignee: Liggett & Myers Incorporated, New York, N.Y.

[22] Filed: Aug. 24, 1972

[21] Appl. No.: 283,372

[52] U.S. Cl.............. 426/2, 426/175, 426/376, 426/524, 426/805
[51] Int. Cl............. A23b 3/06, A23k 1/10
[58] Field of Search............ 99/2 N, 7, 140 N, 195; 426/2, 175, 376, 524, 805

[56] References Cited
UNITED STATES PATENTS

| | | | |
|---|---|---|---|
| 3,156,569 | 11/1964 | Griffin et al. | 99/140 N |
| 3,214,276 | 10/1965 | Sakakibara et al. | 99/140 N |
| 3,595,677 | 7/1971 | Hasegawa et al. | 99/140 N |

OTHER PUBLICATIONS

Chemical Abstracts, Vol. 75, 1971, Article 108623 t

*Primary Examiner*—Norman Yudkoff
*Assistant Examiner*—Curtis P. Ribando
*Attorney, Agent, or Firm*—Kenyon & Kenyon Reilly Carr & Chapin

[57] ABSTRACT

A prepared food product containing thawed frozen fish and as an additive thereto, at least one 5'-nucleotide or salt thereof in proportion at least sufficient to improve the flavor of the thawed frozen fish.

4 Claims, No Drawings

METHOD OF FEEDING CATS THAWED FROZEN FISH FLAVORED WITH 5'-NUCLEOTIDES

FIELD OF THE INVENTION

This invention relates to foods and relates more especially to cat foods containing thawed frozen fish.

BACKGROUND OF THE INVENTION

Notwithstanding the well-known fondness of cats for fish, the pet food industry has found from experience that whereas a given cat food prepared from fresh fish may be readily accepted by cats, a cat food identically prepared and formulated except for having been prepared from thawed frozen fish is so unacceptable to cats as to be an undesirable commercial item. The attendant disadvantage to manufacturers of pet foods is a serious one which is aggravated by the fact that the availability of fresh fish is seasonal and great economies could be had if it were possible to preserve fish by freezing them when the fisheries are glutted with fish and use the frozen fish later on at a time when fresh fish are scarce or unavailable. This problem is one of long standing in the pet food industry. It has been realized heretofore that the freezing of fresh fish must be attended with some phenomenon which affects its acceptability to cats but it is not believed that prior to this invention there have been any measures for successfully preventing or compensating for the loss of acceptability to cats of thawed frozen fish.

GENERAL STATEMENT OF INVENTION

The attainment of the present invention stems from research for the purpose of ascertaining whether there may be any detectable chemical difference resulting from freezing and, if so, whether any such difference is that which is responsible for the aforesaid difference in acceptability to cats. In the course of that portion of the research involving infrared spectrum analyses it became indicated that freshly killed fish contains 5'-nucleotides. It also was ascertained by comparative studies that the 5'-nucleotides found to be present when the fish are freshly killed start breaking down due to enzymatic action as soon as the fish dies. It also was found that the enzymatic degenerative action continues at refrigerated temperature until the 5'-nucleotide content of the fish is lost completely or very nearly completely. Based on these discoveries a cat food was prepared containing thawed frozen fish and there was included therewith as an additive a quantity of 5'-nucleotide in the form of a blend of disodium guanylate and disodium inosinate in an amount roughly corresponding to that present in the fish when the fish was freshly killed. When thus fortified with the added 5'-nucleotide the fish food prepared from thawed frozen fish was found to be as acceptable to cats as when the corresponding cat food was prepared from freshly killed fish. While 5'-nucleotides have heretofore been known to possess such flavor-imparting properties as to indicate their utility as a flavoring material for addition to foods intended for human consumption, so far as I am aware it was not appreciated prior to this invention that freshly killed fish contains a substantial quantity of 5'-nucleotide, that it is lost when attempt is made to preserve the fish by freezing, and that it is this difference which accounts for the behavior of cats in not accepting cat food prepared from thawed frozen fish.

DETAILED DESCRIPTION OF THE INVENTION

A cat food which may be improved by the inclusion of a 5'-nucleotide or a mixture of 5'-nucleotides (including salts thereof) in the practice of this invention may be formulated in any conventional or otherwise desirable way. The thawed frozen fish may constitute all or substantially all of the meat content or may be blended with other meats such as chicken or beef or animal parts such as liver or kidney. The cat food in addition to meat may contain various amounts of other ingredients such as meat meal, poultry meal, fish meal, soy grits, cereals, grains, vitamins, minerals, etc. Usually the thawed frozen fish is the major proportion by weight of a cat food with which this invention is utilized. The total fish content usually is at least about 50 percent of the cat food. The following is a typical formulation for a prepared cat food in which 5'-nucleotide is present as an additive in accordance with this invention, the percentages being percent by weight:

| | |
|---|---|
| Thawed fish | 60 % |
| Beef | 10 % |
| Meat by-products | 15 % |
| Chicken | 14 % |
| Vitamins and minerals | 0.6% |
| Disodium guanylate and/or guanylic acid | 0.01% |
| Disodium inosinate and/or inosinic acid | 0.01% |

Any conventional procedure for preparing the cat food and packaging it in containers suitable for distribution and storage may be employed. In typical preferred practice the thawed frozen fish is ground through a plate having ⅜ inch apertures. For other meats ⅝ inch apertures normally are preferable. The other ingredients including the 5'-nucleotide additive are then mixed with the ground meat and the mix is brought to a temperature of about 160° to 170°F. and cooked at this temperature for about 5–15 minutes. The cooked product is then pumped to a filling machine which fills the product into cans. The cans are then sealed and the contents sterilized as by placing the cans in a retort and holding them at about 250°F. for 50 minutes.

It is to be understood that the foregoing is merely illustrative of the utilization of this invention in the preparation of a cat food and that this invention may be availed of to improve the acceptability of a cat food to cats whenever the cat food contains a substantial proportion of thawed frozen fish. However, the advantages of this invention become of greater significance when the content of thawed fish is about 50 percent or greater by weight based on the weight of the cat food product.

While the preferred 5'-nucleotides for use in the practice of this invention are disodium guanylate and disodium inosinate, the 5'-nucleotides (including their acid form), as a class exhibit properties which contribute to the acceptability to cats of a cat food containing thawed frozen fish. Other examples of suitable 5'-nucleotides are as follows: 5'-adenylic acid, 5'-xantylic acid, or corresponding salts. The crystalline form of the 5'-nucleotide is preferred for solubility reasons.

The optimum amount of added 5'-nucleotide is that which supplements the cat food preparation to the extent of including therein an amount of a 5'-nucleotide which corresponds substantially with the 5'-nucleotide content of the fish content of the cat food as of the moment when the fish was freshly killed so as thereby to restore the 5'-nucleotide destroyed as the result of freezing and storage prior to thawing for use in the preparation of the cat food. This usually is accomplished by the addition of an amount of 5'-nucleotide of the order of 0.001 percent to 0.1 percent by weight based on the weight of the thawed fish in the cat food preparation. However, this invention is realized whenever an amount of 5'-nucleotide is employed which is effective to substantially improve the acceptability to cats of a cat food containing thawed frozen fish. In order to obtain a significant benefit the cat food should contain at least about 0.01 percent by weight of 5'-nucleotide on the weight of the thawed fish content of the cat food. There is no upper limit except that it becomes economically impractical without corresponding benefit to include more than about 0.05 percent by weight of 5'-nucleotide on the weight of the thawed fish.

There are known procedures for the production of 5'-nucleotides which may be used in the practice of this invention. Thus reference may be made among others to the procedures disclosed in U.S. Pat. Nos. 3,104,171; 3,223,592; 3,318,710 and 3,190,877.

It will be understood that it is intended to cover all changes and modifications of the example of the invention herein chosen for the purpose of illustration which do not constitute departures from the spirit and scope of the invention.

I claim:

1. The process of feeding cats comprising the steps of:
   1. feeding cats a food product prepared by the process comprising the steps of:
      a. thawing frozen fish; and
      b. admixing with said thawed frozen fish an additive selected from the group consisting of 5'-guanylic acid, 5'-inosinic acid, 5'-adenylic acid, 5'-xantylic acid, salts thereof and admixtures of said additive, wherein the proportion of said additive admixed with said thawed frozen fish is between about 0.001 percent and 0.1 percent by weight of said thawed frozen fish.

2. The process of claim 1 wherein said additive comprises an admixture of disodium guanylate and disodium inosinate.

3. The process comprising the steps of:
   2. preparing a cat food product comprising the steps of:
      a. thawing frozen fish; and
      b. admixing with said thawed frozen fish an additive selected from the group consisting of 5'-guanylic acid, 5'-inosinic acid, 5'-adenylic acid, 5'-xantylic acid, salts thereof and admixtures of said additive, wherein the proportion of said additive admixed with said thawed frozen fish is between about 0.001 percent and 0.1 percent by weight of said thawed frozen fish; and
   2. feeding said products to cats.

4. The process of claim 3 wherein said additive comprises an admixture of disodium guanylate and disodium inosinate.

* * * * *